US008872888B2

(12) United States Patent
Kitazato

(10) Patent No.: US 8,872,888 B2
(45) Date of Patent: Oct. 28, 2014

(54) CONTENT TRANSMISSION APPARATUS, CONTENT TRANSMISSION METHOD, CONTENT REPRODUCTION APPARATUS, CONTENT REPRODUCTION METHOD, PROGRAM AND CONTENT DELIVERY SYSTEM

(75) Inventor: Naohisa Kitazato, Tokyo (JP)

(73) Assignee: Sony Corporation, Tokyo (JP)

( * ) Notice: Subject to any disclaimer, the term of this patent is extended or adjusted under 35 U.S.C. 154(b) by 615 days.

(21) Appl. No.: 13/238,277

(22) Filed: Sep. 21, 2011

(65) Prior Publication Data

US 2012/0081508 A1 Apr. 5, 2012

Related U.S. Application Data

(60) Provisional application No. 61/504,481, filed on Jul. 5, 2011, provisional application No. 61/388,999, filed on Oct. 1, 2010.

(51) Int. Cl.
| | |
|---|---|
| *H04N 7/08* | (2006.01) |
| *H04N 21/472* | (2011.01) |
| *H04N 21/44* | (2011.01) |
| *H04N 21/434* | (2011.01) |
| *H04N 5/247* | (2006.01) |
| *G06F 15/16* | (2006.01) |

(52) U.S. Cl.
CPC ......... *H04N 5/247* (2013.01); *H04N 21/47205* (2013.01); *H04N 21/44* (2013.01); *H04N 21/4347* (2013.01)
USPC ............................................ 348/36; 725/110

(58) Field of Classification Search
USPC .......................................................... 348/36
See application file for complete search history.

(56) References Cited

U.S. PATENT DOCUMENTS 5,377,349 A * 12/1994 Motomura ...................... 712/17
5,861,881 A * 1/1999 Freeman et al. ............... 715/201

(Continued)

FOREIGN PATENT DOCUMENTS

| EP | 1 389 020 | 2/2004 |
| JP | 2003-9113 | 1/2003 |

(Continued)

OTHER PUBLICATIONS

International Search Report issued Dec. 20, 2011, in PCT/JP2011/071567 (with English-language translation).

(Continued)

*Primary Examiner* — Sath V Perungavoor
*Assistant Examiner* — Howard D Brown, Jr.
(74) *Attorney, Agent, or Firm* — Oblon, Spivak, McClelland, Maier & Neustadt, L.L.P.

(57) ABSTRACT

Disclosed herein is a content transmission apparatus, including: a retaining section adapted to retain a multi viewpoint video content formed from a plurality of viewpoint videos imaged simultaneously by a plurality of different video cameras; a production section adapted to produce a VRT including acquisition destination information of the viewpoint videos which configure the multi viewpoint video content, VRT standing for View Relation Table; a supplying section adapted to supply the produced VRT to a content reproduction apparatus; a broadcasting section adapted to broadcast one or plural ones of the viewpoint videos which configure the retained multi viewpoint video content; and a delivery section adapted to deliver one or plural ones of the viewpoint videos which configure the retained multi viewpoint video content through a network.

15 Claims, 14 Drawing Sheets

View Relation Type = 1 (Panorama)

(56) References Cited

U.S. PATENT DOCUMENTS

| | | | |
|---|---|---|---|
| 7,584,491 B2 * | 9/2009 | Bruckner et al. | 725/36 |
| 8,223,270 B2 * | 7/2012 | Hayashi et al. | 348/578 |
| 2003/0033157 A1 | 2/2003 | Dempski et al. | |
| 2003/0037068 A1 | 2/2003 | Thomas et al. | |
| 2003/0086003 A1 | 5/2003 | Koga | |
| 2004/0076340 A1 * | 4/2004 | Nielsen | 382/284 |
| 2006/0194535 A1 | 8/2006 | Houldsworth et al. | |
| 2007/0169164 A1 | 7/2007 | Marilly et al. | |
| 2008/0028074 A1 | 1/2008 | Ludvig | |
| 2008/0120638 A1 | 5/2008 | King et al. | |
| 2008/0247543 A1 * | 10/2008 | Mick et al. | 380/201 |
| 2009/0087161 A1 | 4/2009 | Roberts et al. | |
| 2009/0106807 A1 * | 4/2009 | Suzuki et al. | 725/114 |
| 2009/0125946 A1 | 5/2009 | Fukuda | |
| 2009/0259730 A1 * | 10/2009 | Machida et al. | 709/219 |
| 2009/0313663 A1 | 12/2009 | Kitazato et al. | |
| 2009/0320064 A1 | 12/2009 | Soldan et al. | |
| 2010/0083306 A1 | 4/2010 | Dempski et al. | |
| 2010/0205628 A1 | 8/2010 | Davis et al. | |
| 2011/0281566 A1 | 11/2011 | Davis et al. | |
| 2011/0283305 A1 | 11/2011 | Davis et al. | |
| 2011/0283306 A1 | 11/2011 | Davis et al. | |
| 2011/0283310 A1 | 11/2011 | Davis et al. | |
| 2011/0283319 A1 | 11/2011 | Davis et al. | |
| 2011/0283328 A1 | 11/2011 | Davis et al. | |
| 2011/0283329 A1 | 11/2011 | Davis et al. | |
| 2012/0011261 A1 | 1/2012 | Hirano et al. | |
| 2012/0084829 A1 * | 4/2012 | Kitazato | 725/110 |
| 2013/0132997 A1 | 5/2013 | King et al. | |
| 2013/0167173 A1 | 6/2013 | Davis et al. | |
| 2013/0339996 A1 | 12/2013 | Davis et al. | |

FOREIGN PATENT DOCUMENTS

| | | |
|---|---|---|
| JP | 2003-18583 | 1/2003 |
| JP | 2003-530033 | 10/2003 |
| JP | 2006-50237 | 2/2006 |
| JP | 2007-116669 | 5/2007 |
| JP | 2008-53916 | 3/2008 |
| JP | 2009-118343 | 5/2009 |
| JP | 2010-288192 | 12/2010 |
| WO | WO 2010/109860 A1 | 9/2010 |

OTHER PUBLICATIONS

International Search Report issued Dec. 20, 2011, in PCT/JP2011/071568 (with English-language translation).
International Search Report issued Dec. 27, 2011, in PCT/JP2011/071569 (with English-language translation).
International Search Report issued Dec. 27, 2011, in PCT/JP2011/071570 (with English-language translation).
Hideaki Kimata, "Movement on MPEG 3DAV toward International Standardization of 3D Video", IPSJ SIG Technical Reports, vol. 2005, No. 23, Mar. 10, 2005, pp. 49-54 (with English Abstract).
U.S. Appl. No. 13/238,080, filed Sep. 21, 2011, Kitazato, et al.
U.S. Appl. No. 13/239,871, filed Sep. 22, 2011, Kitazato.
U.S. Appl. No. 13/238,264, filed Sep. 21, 2011, Kitazato.
U.S. Appl. No. 13/238,065, filed Sep. 21, 2011, Kitazato.
U.S. Appl. No. 13/238,138, filed Sep. 21, 2011, Kitazato.
U.S. Appl. No. 13/220,231, filed Aug. 29, 2011, Kitahara, et al.
U.S. Appl. No. 13/071,559, filed Mar. 25, 2011, Yamagishi, et al.
U.S. Appl. No. 13/081,566, filed Apr. 7, 2011, Kitazato, et al.
U.S. Appl. No. 12/980,917, filed Dec. 29, 2010, Dewa.
U.S. Appl. No. 13/080,866, filed Apr. 6, 2011, Kitazato, et al.
U.S. Appl. No. 13/071,551, filed Mar. 25, 2011, Kitazato, et al.
U.S. Appl. No. 13/071,560, filed Mar. 25, 2011, Yamagishi.
U.S. Appl. No. 13/071,238, filed Mar. 24, 2011, Yamagishi.
U.S. Appl. No. 13/075,440, filed Mar. 30, 2011, Yamagishi, et al.
U.S. Appl. No. 13/107,604, filed May 13, 2011, Dewa.
International Search Report issued Nov. 29, 2011, in PCT/JP2011/071566 filed Sep. 22, 2011 with English translation.
U.S. Appl. No. 13/422,203, filed Mar. 16, 2012, Kitazato, et al.
U.S. Appl. No. 13/452,376, filed Apr. 20, 2012, Kitahara, et al.
U.S. Appl. No. 13/554,688, filed Jul. 20, 2012, Kitazato, et al.
International Search Report issued Jul. 17, 2012 in PCT/JP2012/064806 filed Jun. 8, 2012 (with English-language translation).
Kentaro Yamazaki, "Open House 2011. Linking the TV and the SNS 「Hybridcast」", online URL: http://av.watch.impress.co.jp/docs/news/20110524_448049.html, May 24, 2011, pp. 1-6 plus cover page.
Japanese Office Action issued Feb. 20, 2014 in Patent Application No. 2013-520530 with English Translation.
Extended European Search Report issued Feb. 6, 2014 in Patent Application No. 11828915.6.
Extended European Search Report issued Feb. 26, 2014 in Patent Application No. 11828910.7.
Extended European Search Report issued Mar. 6, 2014 in Patent Application No. 11828911.5.
Extended European Search Report issued May 12, 2014, in European Application No. 11828914.9.
Extended European Search Report issued May 8, 2014, in European Application No. 11828912.3.

\* cited by examiner

View Relation Type = 1 (Panorama)

View Relation Type = 2 (Theater)

View Relation Type = 3 (Parallel)

FIG. 9

| ELEMENT (ATTRIBUTE) | APPEARANCE NUMBER | VALUE | DEFINITION AND DETAILED WORKING |
|---|---|---|---|
| multi-viewpoints | 1..N | | MULTI VIEWPOINT SEGMENT |
| @start NPT | 0..1 | INTEGRAL VALUE (SECOND NUMBER) | MULTI VIEWPOINT SEGMENT START TIME POSITION |
| @end NPT | 0..1 | INTEGRAL VALUE (SECOND NUMBER) | MULTI VIEWPOINT SEGMENT END TIME POSITION |
| @info | 1 | TEXT (URL) | VRT FILE ACQUISITION DESIGNATION URL |

FIG.10

```
<multi_viewpoints startNPT=2310 endNPT=3100 info=http://XXX.com/yyy1.vrt>
<multi_viewpoints startNPT=4821 endNPT=2600 info=http://XXX.com/yyy2.vrt>
```

FIG.11

| ELEMENT (ATTRIBUTE) | APPEARANCE NUMBER | VALUE | DEFINITION AND DETAILED WORKING |
|---|---|---|---|
| View_object | 1..N | | VIEWPOINT OBJECT |
| @id | 1..N | INTEGRAL VALUE EQUAL TO OR MORE THAN 0 | OBJECT ID |
| @name | 0..1 | TEXT | VIEWPOINT NAME |
| @cut | 0..1 | 0 OR 1 | 0: CUTOUT INHIBITED, 1: CUTOUT PERMITTED |
| @format | 0..1 | INTEGRAL VALUE | SIGNAL FORMAT |
| @resolution_h | 0..1 | INTEGRAL VALUE | HORIZONTAL DIRECTION RESOLUTION |
| @resolution_v | 0..1 | INTEGRAL VALUE | VIRTICAL DIRECTION RESOLUTION |
| @location | 1 | TEXT | VIEWPOINT STREAM ACQUISITION DESTINATION URL |
| neighbor_view | 0..1 | | ADJACENT VIEWPOINT OBJECT |
| @id | 1 | INTEGRAL VALUE EQUAL TO OR MORE THAN 0 | OBJECT ID |
| @type | 1 | "panorama" "theater" "parallel" "separated" | VIEWPOINT STRING TYPE |
| @direction | 1 | "up" "down" "left" "right" "forward" "backward" | ADJACENT VIEWPOINT DIRECTION. ONLY "left" AND "right" WITH REGARD TO ANY OTHER TYPE THAN "separated" |
| @distance | 0..1 | NUMERICAL VALUE | UNNECESSARY IN THE CASE OF "separated". WITH REGARD TO "panorama" AND "theater", AN ADJACENT VIEW ANGLE IS INDICATED IN AN ANGLE VALUE. IN CASE OF "parallel", THE DISTANCE BETWEEN ADJACENT CAMERA POSITIONS IS INDICATED IN A UNIT OF METER. |

FIG.12

```
<vrl>
<view_object id=0 format=1 location=http://xxx.com/yyy1.ts>
    <neighbor_view id=1 type="theater direction="left"distance=10>
    <neighbor_view id=2 type="theater direction="right"distance=10>
    <neighbor_view id=10 type="separated" direction="up">
</view_object>
<view_object id=1 format=1 location=http://xxx.com/yyy2.ts>
    <neighbor_view id=0 type="theater direction="right"distance=10>
    <neighbor_view id=10 type="separated"direction="up">
</view_object>
<view_object id=2 format=2 location=http://xxx.com/yyy3.ts>
    <neighbor_view id=0 type="theater direction="left" distance=10>
    <neighbor_view id=10 type="separated" direction="up">
</view_object>
<view_object id=10 format=1 location=http://xxx.com/yyy4.ts>
    <neighbor_view id=0 type="theater direction="down">
</view_object>
<view_object id=20 name=jocky format=1 location=http://xxx.com/yyy5.ts/>
</vrl>
```

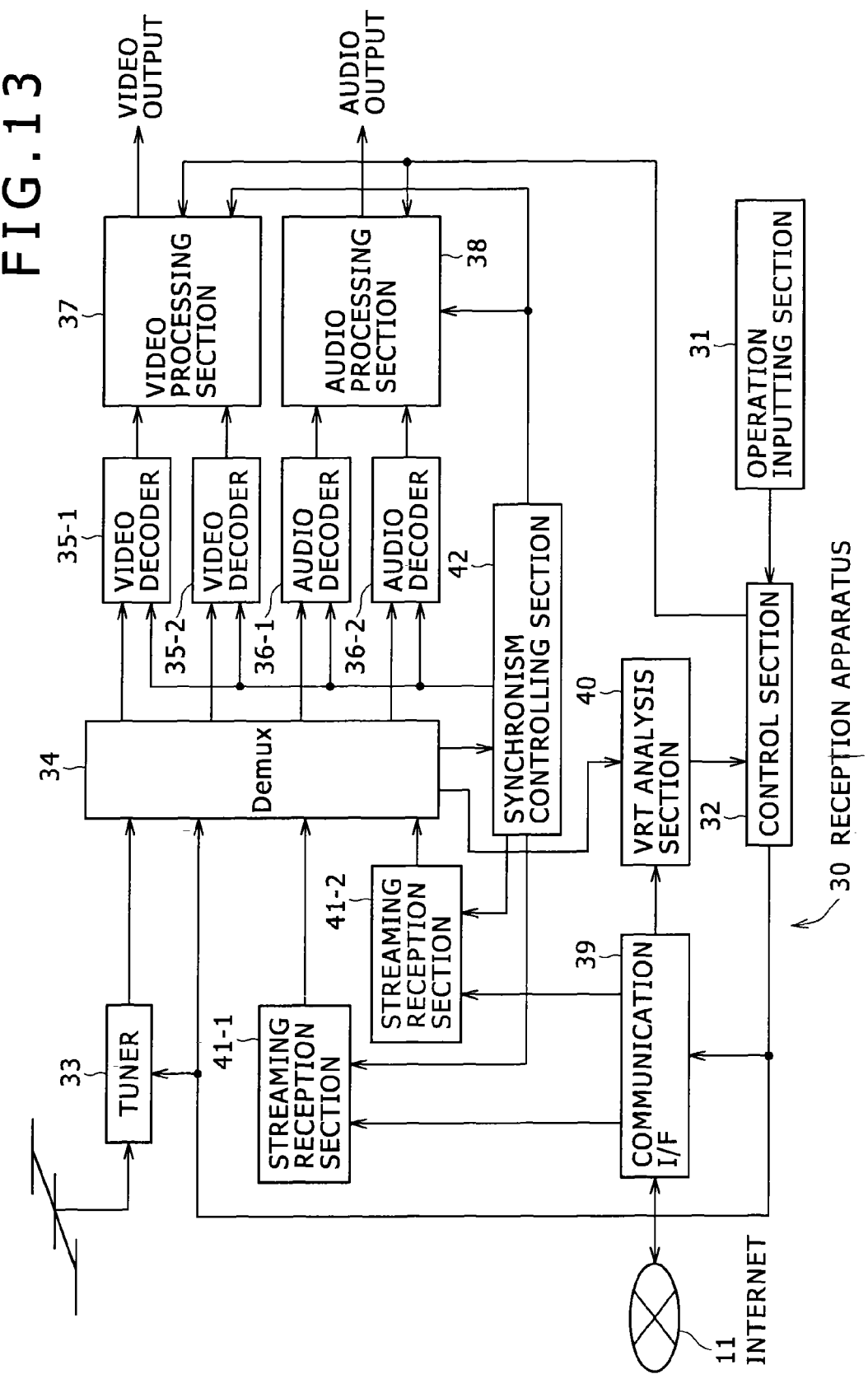

CONTENT TRANSMISSION APPARATUS, CONTENT TRANSMISSION METHOD, CONTENT REPRODUCTION APPARATUS, CONTENT REPRODUCTION METHOD, PROGRAM AND CONTENT DELIVERY SYSTEM

CROSS-REFERENCE TO RELATED APPLICATION

This application claims the benefit of priority of Provisional Application Ser. Nos. 61/388,999, filed on Oct. 1, 2010 and 61/504,481, filed on Jul. 5, 2011, the entire contents of which is incorporated herein by reference.

BACKGROUND

The present disclosure relates to a content transmission apparatus, a content transmission method, a content reproduction apparatus, a content reproduction method, a program and a content delivery system, and particularly to a content transmission apparatus, a content transmission method, a content reproduction apparatus, a content reproduction method, a program and a content delivery system which make it possible for a user of the content reproduction apparatus to view a content with an arbitrary picture frame.

In the past, in a video content delivery service represented by a video on demand service through a television broadcast, the Internet or the like, it is possible for a viewer to view a video content only with a picture frame produced by the broadcasting side.

It is to be noted that video contents which use package media such as a DVD (digital versatile disc) or a BD (blu-ray disc) include those video contents in which a plurality of videos obtained by imaging a sports event, a concert place or the like, which is determined as an object to be imaged, from a plurality of different viewpoints (angles) (so-called multi-angle video) (refer to, for example, Japanese Patent Laid-Open No. 2009-135946).

In the case where a video content ready for a multi-angle video is reproduced, a viewer can select and view one of the plural videos. However, even in the case of a video content ready for a multi-angle video, the viewer cannot view a video with an arbitrary picture frame, that is, in a state in which it is imaged from an arbitrary viewpoint.

SUMMARY

Incidentally, with regard to video contents, appearance of such a viewing form that not only a video of a broadcasted picture frame or videos of multi-angles prepared in advance can be selected but also a video imaged from an arbitrary viewpoint conforming to the liking of each viewer can be viewed is demanded.

In particular, for example, there is a demand to watch a scene, which is not currently displayed on the screen, on the right of a scene (object to be imaged) currently displayed on the screen or to watch a scene (object to be imaged) currently displayed on the screen from the side.

The present disclosure has been made in view of such a situation as described above and makes it possible to view a video in a state in which it is imaged from an arbitrary viewpoint.

A content transmission apparatus according to a first embodiment of the present disclosure is a content transmission apparatus, including a retaining section adapted to retain a multi viewpoint video content formed from a plurality of viewpoint videos imaged simultaneously by a plurality of different video cameras, a production section adapted to produce a VRT (View Relation Table) including acquisition destination information of the viewpoint videos which configure the multi viewpoint video content, a supplying section adapted to supply the produced VRT to a content reproduction apparatus, a broadcasting section adapted to broadcast one or plural ones of the viewpoint videos which configure the retained multi viewpoint video content, and a delivery section adapted to deliver one or plural ones of the viewpoint videos which configure the retained multi viewpoint video content through a network.

The production section may produce the VRT which further includes a viewpoint string type representative of a relationship between an adjacent viewpoint video imaged adjacent each of the viewpoint videos which configure the video content and the viewpoint video.

The viewpoint string type may be Panorama, Theater, Parallel or Separated.

The broadcasting section or the delivery section may serve also as the supplying section.

A content transmission method according to the first embodiment of the present disclosure is a content transmission method for a content transmission apparatus which supplies a multi viewpoint video content formed from a plurality of viewpoint videos imaged simultaneously by a plurality of different video cameras to a content reproduction apparatus, including producing a VRT including acquisition destination information of the viewpoint videos which configure the multi viewpoint video content, supplying the produced VRT to a content reproduction apparatus, broadcasting one or plural ones of the viewpoint videos which configure the retained multi viewpoint video content, and delivering one or plural ones of the viewpoint videos which configure the retained video content through a network, carried out by the content transmission apparatus.

A program according to the first embodiment of the present disclosure is a program for causing a computer to function as a retaining section adapted to retain a multi viewpoint video content formed from a plurality of viewpoint videos imaged simultaneously by a plurality of different video cameras, a production section adapted to produce a VRT including acquisition destination information of the viewpoint videos which configure the multi viewpoint video content, a supplying section adapted to supply the produced VRT to a content reproduction apparatus, a broadcasting section adapted to broadcast one or plural ones of the viewpoint videos which configure the retained multi viewpoint video content, and a delivery section adapted to deliver one or plural ones of the viewpoint videos which configure the retained video content through a network.

In the first embodiment of the present disclosure, a VRT including acquisition destination information of viewpoint videos which configure a multi viewpoint video content is produced, and the produced VRT is supplied to a content reproduction apparatus. The plural viewpoint videos which configure the retained multi viewpoint video content are broadcasted, and the plural viewpoint videos which configure the retained multi viewpoint video content are delivered through a network.

A content reproduction apparatus according to a second embodiment of the present disclosure is a content reproduction apparatus for reproducing a multi viewpoint video content formed from a plurality of viewpoint videos imaged simultaneously by a plurality of different video cameras, including an acquisition section adapted to acquire a VRT including acquisition destination information of the viewpoint videos which configure the multi viewpoint video content, an inputting section adapted to input a viewpoint moving operation from a user therethrough, a reception section adapted to receive, from among the plural viewpoint videos which configure the multi viewpoint video content, the plurality of viewpoint videos corresponding to the inputted viewpoint moving operation based on the VRT, and a production section adapted to produce a video corresponding to the viewpoint moving operation based on the received plural viewpoint videos.

The acquired VRT may further include a viewpoint string type representative of a relationship between an adjacent viewpoint video imaged adjacent each of the viewpoint videos which configure the video content and the viewpoint video.

The viewpoint string type may be Panorama, Theater, Parallel or Separated.

The production section may connect, in the case where the viewpoint string type of the received plural viewpoint videos is Panorama or Parallel, the received plural viewpoint videos to each other and cuts out a predetermined region to produce a video corresponding to the viewpoint moving operation, but produce, in the case where the viewpoint string type of the received plural viewpoint videos is Theater, a video corresponding to the viewpoint moving operation by an interpolation process using the received plural viewpoint videos.

The reception section may receive, from among the plural viewpoint videos which configure the multi viewpoint video content, the plural viewpoint videos corresponding to the inputted viewpoint moving operation from within a broadcasting signal or acquire the plural viewpoint videos corresponding to the inputted viewpoint moving operation from a content transmission apparatus through a communication network.

The inputting section may be formed from a viewpoint moving button included in the acquired VRT and corresponding to a viewpoint string type of an adjacent viewpoint video imaged adjacent each viewpoint video which configures the multi viewpoint video content.

A content reproduction method according to the second embodiment of the present disclosure is a content reproduction method for a content reproduction apparatus which reproduces a multi viewpoint video content formed from a plurality of viewpoint videos imaged simultaneously by a plurality of different video cameras, including acquiring a VRT including acquisition destination information of the viewpoint videos which configure the multi viewpoint video content, inputting a viewpoint moving operation from a user therethrough, receiving, from among the plural viewpoint videos which configure the multi viewpoint video content, a plurality of viewpoint videos corresponding to the inputted viewpoint moving operation based on the VRT, and producing a video corresponding to the viewpoint moving operation based on the received plural viewpoint videos, carried out by the content reproduction apparatus.

A program according to the second embodiment of the present disclosure is a program for causing a computer, which reproduces a multi viewpoint video content formed from a plurality of viewpoint videos imaged simultaneously by a plurality of different video cameras, to function as an acquisition section adapted to acquire a VRT including acquisition destination information of the viewpoint videos which configure the multi viewpoint video content, an inputting section adapted to input a viewpoint moving operation from a user therethrough, a reception section adapted to receive, from among the plural viewpoint videos which configure the multi viewpoint video content, a plurality of viewpoint videos corresponding to the inputted viewpoint moving operation based on the VRT, and a production section adapted to produce a video corresponding to the viewpoint moving operation based on the received plural viewpoint videos.

In the second embodiment of the present disclosure, a VRT including acquisition destination information of viewpoint videos which configure a multi viewpoint video content is acquired, and a viewpoint moving operation is inputted from a user. Then, from among the plural viewpoint videos which configure the multi viewpoint video content, a plurality of viewpoint videos corresponding to the inputted viewpoint moving operation are received based on the VRT. Then, a video corresponding to the viewpoint moving operation is produced based on the received plural viewpoint videos.

A content delivery system according to a third embodiment of the present disclosure is a content delivery system which includes a content transmission apparatus and a content reproduction apparatus, wherein the content transmission apparatus includes a retaining section adapted to retain a multi viewpoint video content formed from a plurality of viewpoint videos imaged simultaneously by a plurality of different video cameras, a production section adapted to produce a VRT including acquisition destination information of the viewpoint videos which configure the multi viewpoint video content, a supplying section adapted to supply the produced VRT to the content reproduction apparatus, a broadcasting section adapted to broadcast one or plural ones of the viewpoint videos which configure the retained multi viewpoint video content, and a delivery section adapted to deliver one or plural ones of the viewpoint videos which configure the retained multi viewpoint video content through a network, and the content reproduction apparatus includes an acquisition section adapted to acquire the VRT, an inputting section adapted to input a viewpoint moving operation from a user therethrough, a reception section adapted to receive, from among the plural viewpoint videos which configure the multi viewpoint video content, a plurality of the viewpoint videos corresponding to the inputted viewpoint moving operation based on the VRT, and a production section adapted to produce a video corresponding to the viewpoint moving operation based on the received plural viewpoint videos.

In the third embodiment of the present disclosure, by the content transmission apparatus, a VRT including acquisition destination information of viewpoint videos which configure a multi viewpoint video content is produced, and the produced VRT is supplied to a content reproduction apparatus. Further, the plural viewpoint videos which configure the retained multi viewpoint video content are broadcasted, and the plural viewpoint videos which configure the retained multi viewpoint video content are delivered through a network. On the other hand, by the content reproduction apparatus, the VRT is acquired, and a viewpoint moving operation is inputted from a user. Further, from among the plural viewpoint videos which configure the multi viewpoint video content, a plurality of viewpoint videos corresponding to the inputted viewpoint moving operation are received based on the VRT. Then, a video corresponding to the viewpoint moving operation is produced based on the received plural viewpoint videos.

With the first embodiment of the present disclosure, a video content which can be viewed in a state which it is imaged from an arbitrary viewpoint can be supplied to the reception side.

With the second embodiment of the present disclosure, a video in a state in which it is imaged from an arbitrary viewpoint can be viewed.

With the third embodiment of the present disclosure, a viewer can view a video in a state in which it is imaged from a viewpoint determined arbitrarily by the user.

BRIEF DESCRIPTION OF THE DRAWINGS

FIG. 9 is a view illustrating an example of reference information for acquiring a VRT;

FIG. 10 is a view illustrating an example of a description of reference information;

FIG. 11 is a view illustrating an example of a VRT;

FIG. 12 is a view illustrating an example of a description of a VRT;

FIG. 13 is a block diagram showing an example of a configuration of a reception apparatus;

DETAILED DESCRIPTION OF THE PREFERRED EMBODIMENTS

In the following, the best mode (hereinafter referred to as embodiment) for carrying out the present disclosure is described in detail with reference to the drawings.

[Outline of the Multi Viewpoint Video Content Viewing System]

An outline of a multi viewpoint video content viewing system of an embodiment of the present disclosure is described. According to the multi viewpoint video content viewing system, one video content is configured from a plurality of viewpoint videos imaged from a plurality of different camera positions, and on the reception side, an arbitrary range is cut out from each multi viewpoint video or a plurality of viewpoint videos are connected to each other or else interpolation is carried out so that a video in a state in which it is imaged from an arbitrary viewpoint can be viewed. A plurality of viewpoint videos which configure a multi viewpoint video content need not necessarily be same in resolution or coding format.

It is to be noted that a multi viewpoint video content may be configured from a plurality of viewpoint videos over an entire period or may be configured from a plurality of viewpoint videos over only part of a period.

A multi viewpoint video content formed from a plurality of viewpoint videos is retained on the transmission side, and for example, one viewpoint video which represents the multi viewpoint video content and is obtained by imaging an object to be imaged from the front from among a plurality of viewpoint videos which configure the multi viewpoint video content is determined as a default multi viewpoint video (entry). The viewpoint videos are broadcasted or delivered through individually different transmission lines (Broadcast Stream in television broadcasting, Internet Stream in network delivery).

Relationships of a plurality of multi viewpoint videos which configure a multi viewpoint video content are classified into four different viewpoint string types of View Relation Type=1 (Panorama), View Relation Type=2 (Theater), View Relation Type=3 (Parallel) and View Relation Type=4 (Separated).

Figure 1:
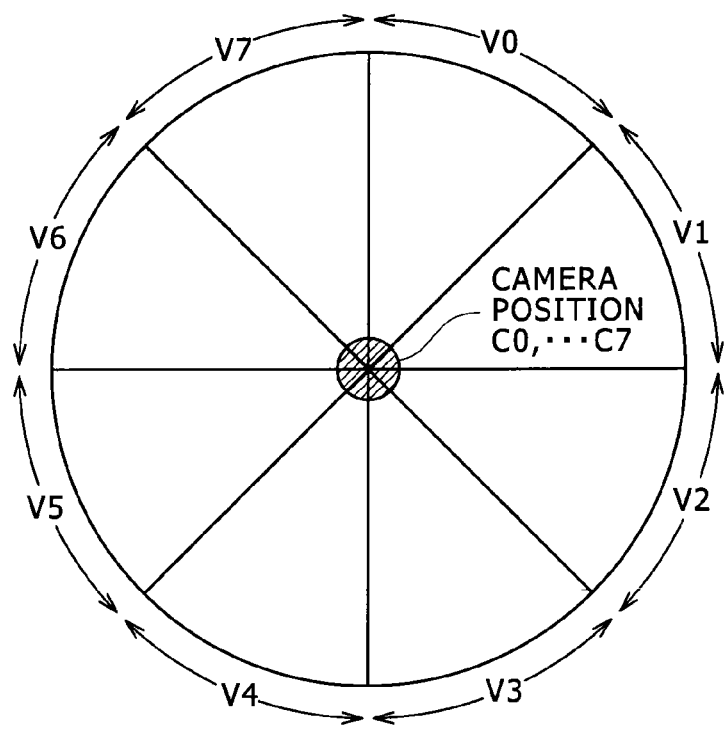
FIG. 1 is a view illustrating View Relation Type=1 (Panorama)

FIG. 1 illustrates a situation upon imaging of a multi viewpoint video content formed from viewpoint strings of View Relation Type=1 (Panorama). In this instance, the multi viewpoint video content is obtained by disposing a plurality of video cameras at the same camera position such that they simultaneously pick up videos in different directions from one another. In the case of FIG. 1, by equally dividing the full circumference of 360° into eight segments and simultaneously picking up videos from the same camera positions C0 to C7, viewpoint strings of viewpoint videos V0 to V7 of View Relation Type=1 (Panorama) are obtained.

It is to be noted that, in the case where a video content is configured from viewpoint strings of Panorama, viewpoint strings for the full circumference of 360° need not necessarily be prepared. For example, a video content may be configured from viewpoint strings for one half circumference of 180° centered at the same camera position. Also the number of video cameras to be used for imaging is optional. If a smaller number of video cameras are used to increase the imaging angle of view per one video camera, then the execution frequency of a process of connecting two viewpoints on the reception side can be reduced. On the contrary, if a greater number of video cameras are used to reduce the imaging angle of view per one video camera, then picture quality deterioration such as distortion which may occur with an interpolation video can be suppressed.

Figure 2:
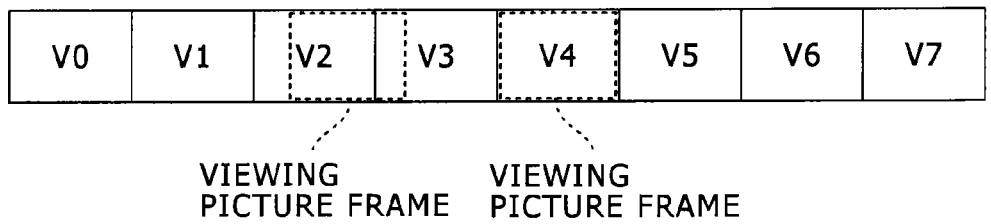
FIG. 2 is a view illustrating a state in which a plurality of multi viewpoint videos, which configure a video content of Panorama, in a horizontal direction.

FIG. 2 illustrates a state in which the viewpoint strings V0 to V7 of Panorama which configure a video content are connected to each other in a horizontal direction.

On the reception side, not only it is possible to select and view one of the viewpoint strings V0 to V7 but also it is possible to designate a picture frame extending over the two viewpoint strings V2 and V3 to view the video content. For example, in the case where a viewing picture frame which occupies only the viewpoint string V4 is designated as shown in FIG. 2, only the viewpoint string V4 is received and decoded. On the other hand, in the case where a viewing picture frame extending over the viewpoint strings V2 and V3 is designated, the viewpoint strings V2 and V3 are received and decoded and then a viewing picture frame is cut out.

Figure 3:
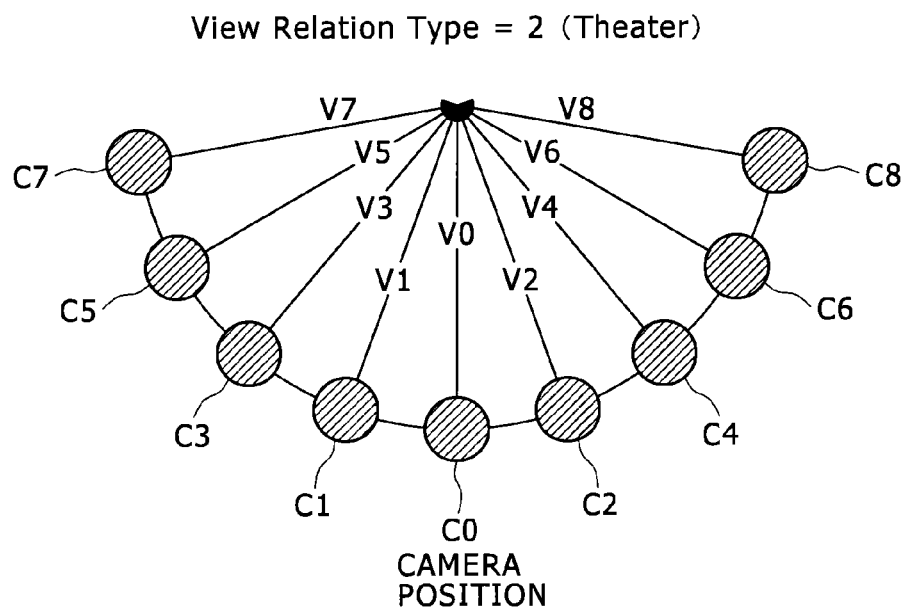
FIG. 3 is a view illustrating View Relation Type=2 (Theater)

FIG. 3 illustrates a situation upon imaging of a multi viewpoint video content formed from viewpoint strings of View Relation Type=2 (Theater). In this instance, the multi viewpoint video content is obtained by providing a plurality of camera positions (viewpoints) on a circumference surrounding an object to be imaged such that videos of the object to be imaged are imaged simultaneously from the individual camera positions. In the case of FIG. 3, nine camera positions C0 to C8 are provided on a circumference surrounding an object to be imaged, and by carrying out imaging simultaneously from the camera positions C0 to C8, viewpoint strings V0 to V8 of Theater are obtained.

On the reception side, not only it is possible to view one of the viewpoint strings V0 to V8 imaged from the camera positions C0 to C8 different from one other on the same circumference, but also it is possible to produce videos in a state in which they are imaged from arbitrary positions different from the camera positions C0 to C8 on the same circumference by interpolation and view the video content. For example, in order to view a video in a state in which it is imaged from between the camera position C2 and the camera position C4, the viewpoint videos V2 and V4 are received and decoded and a desired video is produced by an interpolation process using the viewpoint videos V2 and V4.

Figure 4:
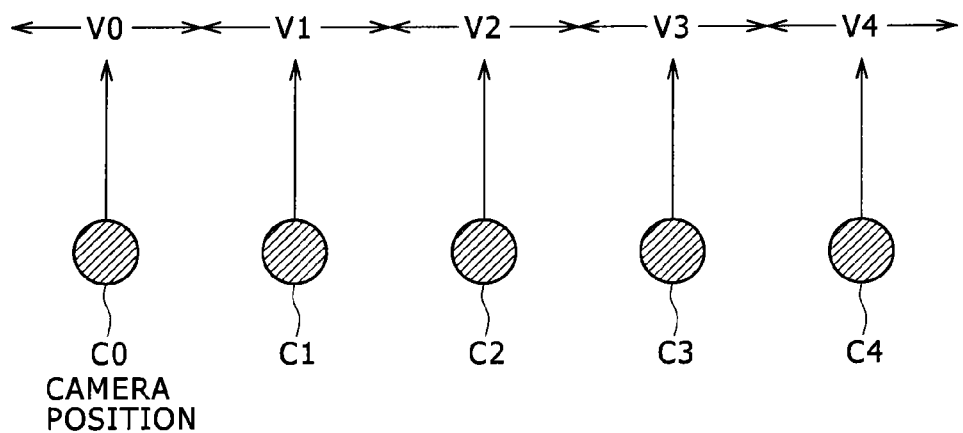
FIG. 4 is a view illustrating View Relation Type=3 (Parallel)

FIG. 4 illustrates a situation upon imaging of a multi viewpoint video content formed from viewpoint strings of View Relation Type=3 (Parallel). In this instance, the multi viewpoint video content is obtained by providing a plurality of camera positions (viewpoints) on a straight line opposing to an object to be imaged such that imaging is carried out simultaneously such that the imaging directions from the camera positions may be parallel to each other. In the case of FIG. 4, five camera positions C0 to C4 are provided on a straight line, and by carrying out imaging simultaneously from the camera positions C0 to C4, viewpoint strings V0 to V4 of Parallel are obtained.

On the reception side, not only it is possible to view one of the viewpoint strings V0 to V4 imaged from the camera positions C0 to C4 different from one another on the straight line, but also it is possible to produce video signals in a state in which they are imaged from arbitrary positions different from the camera positions C0 to C4 on the same straight line by interpolation and view the multi viewpoint video content. For example, in order to view a video in a state in which it is imaged from between the camera position C1 and the camera position C2, the multi viewpoint videos V1 and V2 are received and decoded, and a desired video is produced by an interpolation process using the multi viewpoint videos V1 and V2.

Figure 5:
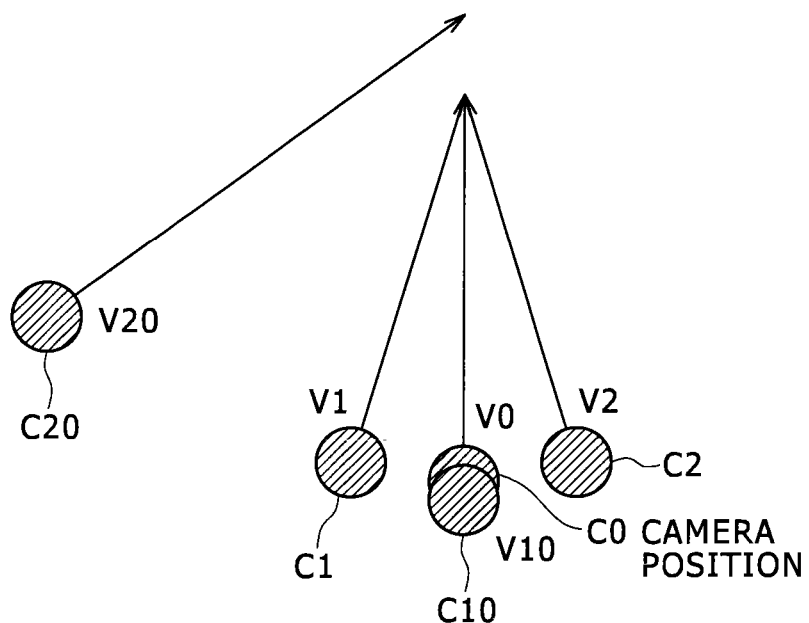
FIG. 5 is a view illustrating View Relation Type=4 (Separated)

FIG. 5 illustrates a situation upon imaging of a multi viewpoint video content formed from viewpoint strings of View Relation Type=4 (Separated). In this instance, the multi viewpoint video content is obtained by carrying out imaging of an object to be imaged from camera positions which are provided discretely without any regularity from the other camera positions. In the case of FIG. 5, from among five camera positions C0, C1, C2, C10 and C20, the camera positions C0, C1 and C2 are disposed on the same circumference while the camera position C10 is disposed upwardly of the camera position C0 and the camera position C20 is provided discretely without any regularity. Therefore, the viewpoint string type of the viewpoint strings V10 and V20 imaged from the camera positions C10 and C20 becomes Separated.

It is to be noted that one multi viewpoint video content may be configured such that a plurality of viewpoint strings of different viewpoint string types are used mixedly.

[Example of the Configuration of the Multi Viewpoint Video Content Viewing System]

Now, an example of a configuration of the multi viewpoint video content viewing system of the embodiment of the present disclosure is described.

Figure 6:
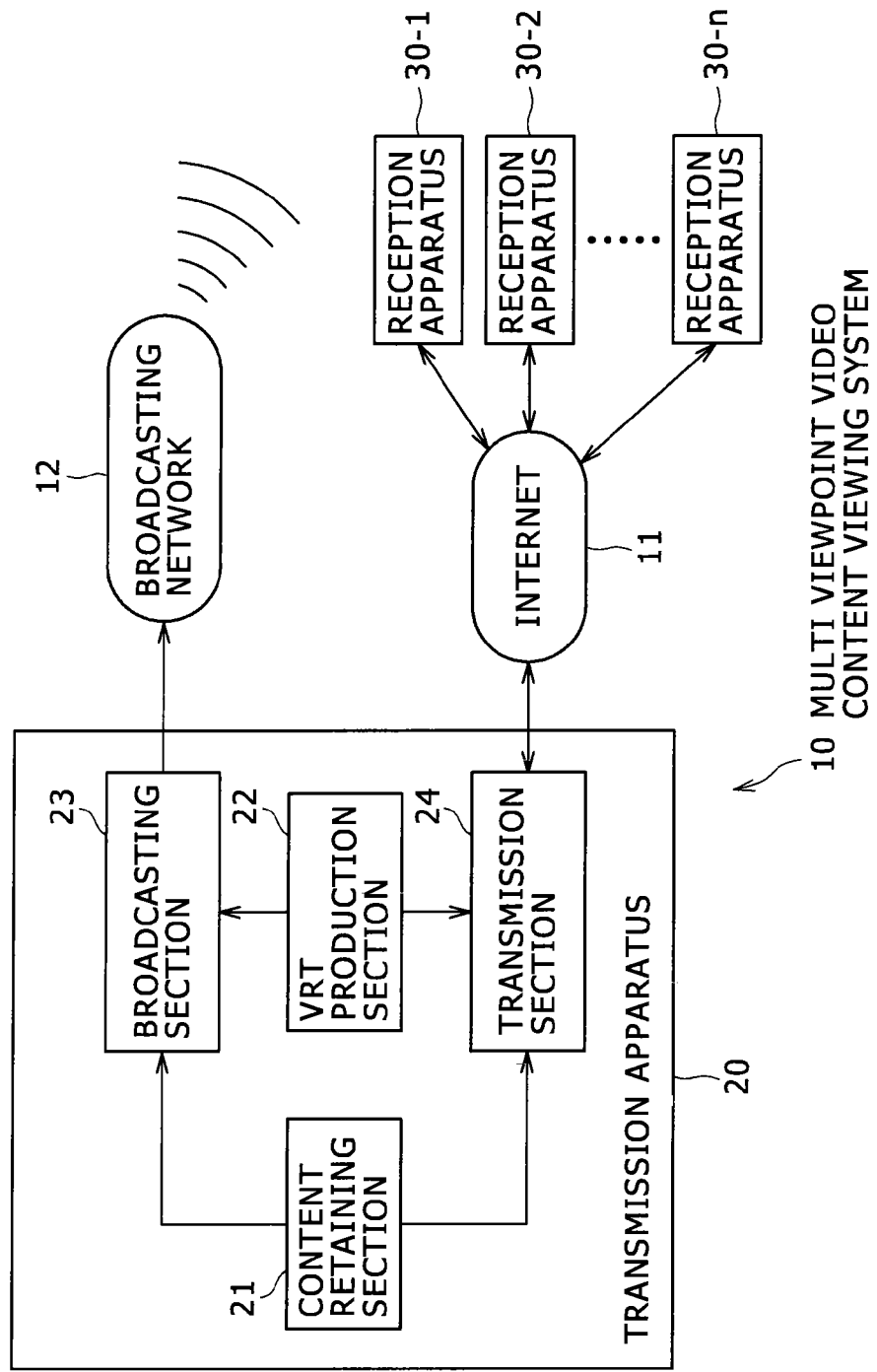
FIG. 6 is a block diagram showing an example of a configuration of a multi viewpoint video content viewing system to which the present disclosure is applied.

FIG. 6 shows an example of a configuration of the multi viewpoint video content viewing system of the embodiment of the present disclosure.

This multi viewpoint video content viewing system 10 is configured from a transmission apparatus 20, and reception apparatus 30-1 to 30-n connected to the transmission apparatus 20 through the Internet 11. In the following description, where there is no necessity to individually distinguish the reception apparatus 30-1 to 30-n from one another, each of them is referred to simply as reception apparatus 30.

The transmission apparatus 20 includes a content retaining section 21, a VRT production section 22, a broadcasting section 23, and a transmission section 24.

In the content retaining section 21, a multi viewpoint video content configured from a plurality of viewpoint videos is retained. The VRT production section 22 produces a VRT (View Relation Table) necessary for the reception side to receive the multipoint videos, and outputs the VRT to the broadcasting section 23 or the transmission section 24.

The VRT includes information of viewpoint string types of a plurality of viewpoint videos which configure the multi viewpoint video content, an acquisition destination URL (URL of Broadcast Stream or Internet Stream) and so forth. It is to be noted that details of the VRT are hereinafter described with reference to FIGS. 7 to 12.

The broadcasting section 23 reads out a predetermined one (for example, a default (entry) viewpoint video or the like) of a plurality of viewpoint videos retained in the content retaining section 21 and configuring a multi viewpoint video content, and broadcasts the read out predetermined viewpoint video as Broadcast Stream. In other words, the broadcasting section 23 broadcasts the predetermined viewpoint video as a television program through a broadcasting network 12. Further, the broadcasting section 23 places the produced VRT into a predetermined position of the broadcasting signal and broadcasts the broadcasting signal.

The transmission section 24 reads out a predetermined one (for example, one imaged from a representative camera position such as a viewpoint video other than the default (entry) viewpoint video) of a plurality of viewpoint videos retained in the content retaining section 21 and configuring a multi viewpoint video content, and delivers the predetermined viewpoint video as Internet Stream through the Internet 11. Further, in accordance with a request from a reception apparatus 30-i, the transmission section 24 transmits the produced VRT to the reception apparatus 30-i of the request source through the Internet 11.

It is to be noted that all viewpoint videos which configure the multi viewpoint video content may be broadcast as Broadcast Stream through the broadcasting network 12. On the contrary, all viewpoint videos which configure the multi viewpoint video content may be delivered as Internet Stream through the Internet 11. Or else, all or some of viewpoint videos which configure the multi viewpoint video content may be supplied in a state in which they are recorded on a storage medium such as a BD (blu-ray disc) to the reception side.

[VRT]

Figure 7:
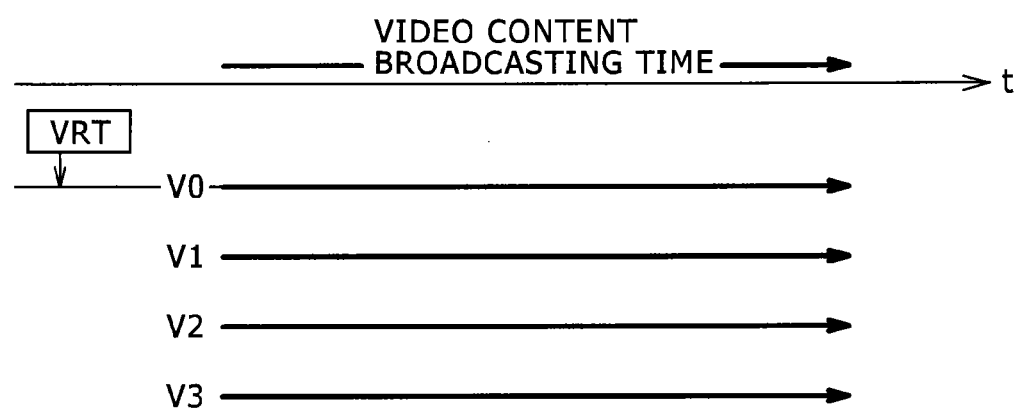
FIG. 7 is a view illustrating a transmission timing of a VRT in the case where multi viewpoint videos are prepared over a full period of a video content.

FIG. 7 illustrates a transmission timing of a VRT in the case where the entire period of the multi viewpoint video content is configured from a plurality of viewpoint videos.

In this instance, one VRT is prepared for the video content. This VRT may be supplied to the reception side before starting of broadcasting of the video content. In particular, reference information including the VRT or an acquisition destination of the VRT may be described in the EIT (Event Information Table) or the PMT (Program Map Table) of the television broadcasting signal.

It is to be noted that, in the case where all viewpoint videos which configure the multi viewpoint video content are delivered through the Internet 11, reference information including the VRT and an acquisition destination of the VRT may be conveyed as a kind of a meta file acquired before the video content is reproduced like, for example, CAD or ERI (Entry Resource Information) to the reception side.

Figure 8:
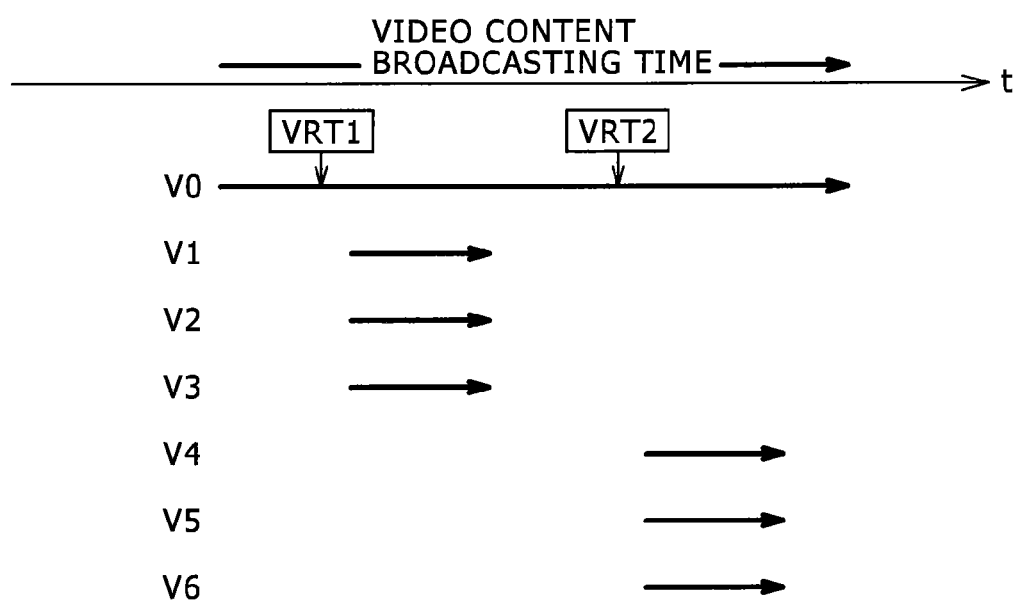
FIG. 8 is a view illustrating a transmission timing of a VRT in the case where multi viewpoint videos are prepared over part of a period of a video content.

FIG. 8 illustrates a transmission timing of a VRT in the case where part of a period of a video content is configured from multi viewpoint videos, or in other words, a plurality of viewpoint videos.

In this instance, a VRT is prepared for each of two periods (hereinafter referred to also as multi viewpoint segments) within which a multi viewpoint video is configured from a plurality of viewpoint videos. Each VRT may be supplied to the reception side before the starting timing of the multi viewpoint segment. In particular, reference information including an acquisition destination of the VRT corresponding to each segment may be described in the PMT of the television broadcasting signal.

It is to be noted that, in the case where all viewpoint videos which configure the multi viewpoint video content are delivered through the Internet 11, reference information including the VRT and an acquisition destination of the VRT may be conveyed as a kind of a meta file (for example, CAD or ERI) acquired before the video content is reproduced to the reception side.

FIG. 9 illustrates an example of reference information including an acquisition destination of a VRT to be supplied to the reception side, and FIG. 10 illustrates an example of a particular description of reference information.

Multi-viewpoints are provided by a number equal to the number of multi viewpoint segments in one video content. For example, in the case of FIG. 8, two Multi-viewpoints are described.

In Multi-viewpoints, three elements of @startNPI, @endNPT and @info are provided. In @startNPT, a start time position of the multi viewpoint segment is described in NPT (Normal Play Time). In @endNPT, an end time position of the multi viewpoint segment is described in NPT. In @info, a URL indicative of an acquisition destination of the corresponding VRT is described.

FIG. 11 illustrates an example of a VRT, and FIG. 12 illustrates an example of a description of a VRT corresponding to a video content imaged in the situation illustrated in FIG. 5.

A View_object element is information relating to each viewpoint video which configures the multi viewpoint video content, and a number of View_object elements equal to the number of viewpoints are described. For View_object, seven attributes of id, name, cut, format, resolution_h, resolution_v, and location are provided.

In the id attribute of View_object, identification information of the pertaining viewpoint in the multi viewpoint video is described. In the name attribute, a name of the pertaining viewpoint video is described. In the cut attribute, whether or not partial cutting out from the pertaining viewpoint video is permitted is described. In the format attribute, a coding format of the pertaining viewpoint video is described. In the resolution_h attribute, a resolution of the pertaining viewpoint video in the horizontal direction is described. In the resolution_v attribute, a resolution of the pertaining viewpoint video in the vertical direction is described. In @location, an acquisition destination URL of the pertaining viewpoint video is described.

Further, in the View_object element, a neighbor_view element representative of information regarding a viewpoint video imaged at a camera position adjacent the camera position at which the pertaining viewpoint video corresponding to View_object is imaged is described as a child element. For the neighbor_view element, four attributes of an id attribute, a type attribute, a direction attribute and a distance attribute are provided.

In the id attribute of the neighbor_view element, identification information of a viewpoint video (hereinafter referred to as adjacent viewpoint video) imaged at a camera position adjacent the camera position at which the viewpoint video corresponding to the View_object element of the parent element is imaged is described. In the type attribute, a viewpoint string type between adjacent viewpoints is described. In the direction attribute, a direction of the camera position at which an adjacent viewpoint video is imaged with respect to the camera position at which the pertaining multi viewpoint video corresponding to the View_object element is imaged is described. In the distance attribute, a distance or an angle of the camera position at which an adjacent viewpoint video is imaged with respect to the camera position at which the pertaining viewpoint video corresponding to the View_object element is imaged is described.

[Example of the Configuration of the Reception Apparatus 30]

FIG. 13 shows an example of a configuration of the reception apparatus 30. The reception apparatus 30 includes an operation inputting section 31, a control section 32, a tuner 33, a demultiplexing (DEMUX) section 34, video decoders 35-1 and 35-2, audio decoders 36-1 and 36-2, a video processing section 37, an audio processing section 38, a communication interface (I/F) 39, a VRT analysis section 40, streaming reception sections 41-1 and 41-2, and a synchronism controlling section 42.

The operation inputting section 31 is formed, for example, from a remote controller, a reception section therefor (both not shown) and so forth, and accepts an operation of a user and notifies the control section 32 of the operation. In particular, the operation inputting section 31 accepts an operation of a user for selecting a video content, designating a position or a size of a picture frame of the video content or designating a viewpoint (camera position), and notifies the control section 32 of the operation.

The control section 32 controls the components of the reception apparatus 30 in response to an operation of the user inputted using the operation inputting section 31. The tuner 33 receives a broadcasting signal (Broadcast Stream) of a default (entry) viewpoint video from among television broadcasting signals broadcasted through the broadcasting network 12 and outputs the received streaming data to the demultiplexing section 34.

The streaming reception sections 41-1 and 41-2 receive the streaming data (Internet Stream) of multi viewpoint video from the transmission apparatus 20 via the communication interface 39 and the Internet 11 and output the received streaming data to the demultiplexing section 34.

The demultiplexing section 34 separates a VRT or reference signal for acquiring a VRT included in the PMT, EIT or the like from within a broadcasting signal inputted from the tuner 33 and supplies the VRT or the reference signal to the VRT analysis section 40. Further, the demultiplexing section 34 separates, from a broadcasting signal inputted from the tuner 33 and streaming data inputted from the streaming reception sections 41, video coded data and audio coded data. It is to be noted that it is assumed that the demultiplexing section 34 can process at least two systems of streaming data at the same time. The separate video coded data are inputted to the video decoder 35-1 or 35-2 while the separated audio coded data are inputted to the audio decoder 36-1 or 36-2.

The video decoders 35-1 and 35-2 decode video coded data inputted thereto and output video signals of different viewpoint videos obtained by the decoding to the video processing section 37. The audio decoders 36-1 and 36-2 decode audio coded data inputted thereto and output audio signals at individual viewpoints obtained by the decoding to the audio processing section 38.

The video processing section 37 connects two video signals (which correspond to two viewpoint videos whose camera positions are adjacent each other) inputted from the video decoders 35-1 and 35-2 and cuts out a predetermined region, produces a video corresponding to an arbitrary viewpoint by interpolation, or superposes a video of an operation button, which serves as a user interface, to produce a video signal to be presented to the user. The video processing section 37 then outputs the produced video signal to a monitor (not shown) on the succeeding stage. The audio processing section 38 synthesizes two audio signals (which correspond to two viewpoint videos whose camera positions are adjacent each other) inputted from the audio decoders 36-1 and 36-2 to produce an audio signal to be presented to the user and outputs the audio signal to the monitor (not shown) on the succeeding stage.

The communication I/F 39 establishes connection to the transmission apparatus 20 through the Internet 11.

The VRT analysis section 40 acquires, in the case where reference information for acquiring a VRT is supplied thereto from the demultiplexing section 34, a VRT from the transmission apparatus 20 through the communication I/F 39 and the Internet 11 in accordance with the reference information. Further, the VRT analysis section 40 analyzes a VRT supplied thereto from the demultiplexing section 34 or acquired by the VRT analysis section 40 itself and outputs a result of the analysis to the control section 32.

The synchronism controlling section 42 controls the video decoders 35-1 and 35-2, audio decoders 36-1 and 36-2, video processing section 37, audio processing section 38 and streaming reception sections 41-1 and 41-2 so that operation timings of them may be synchronized with each other.

Description of Operation

Figure 14:
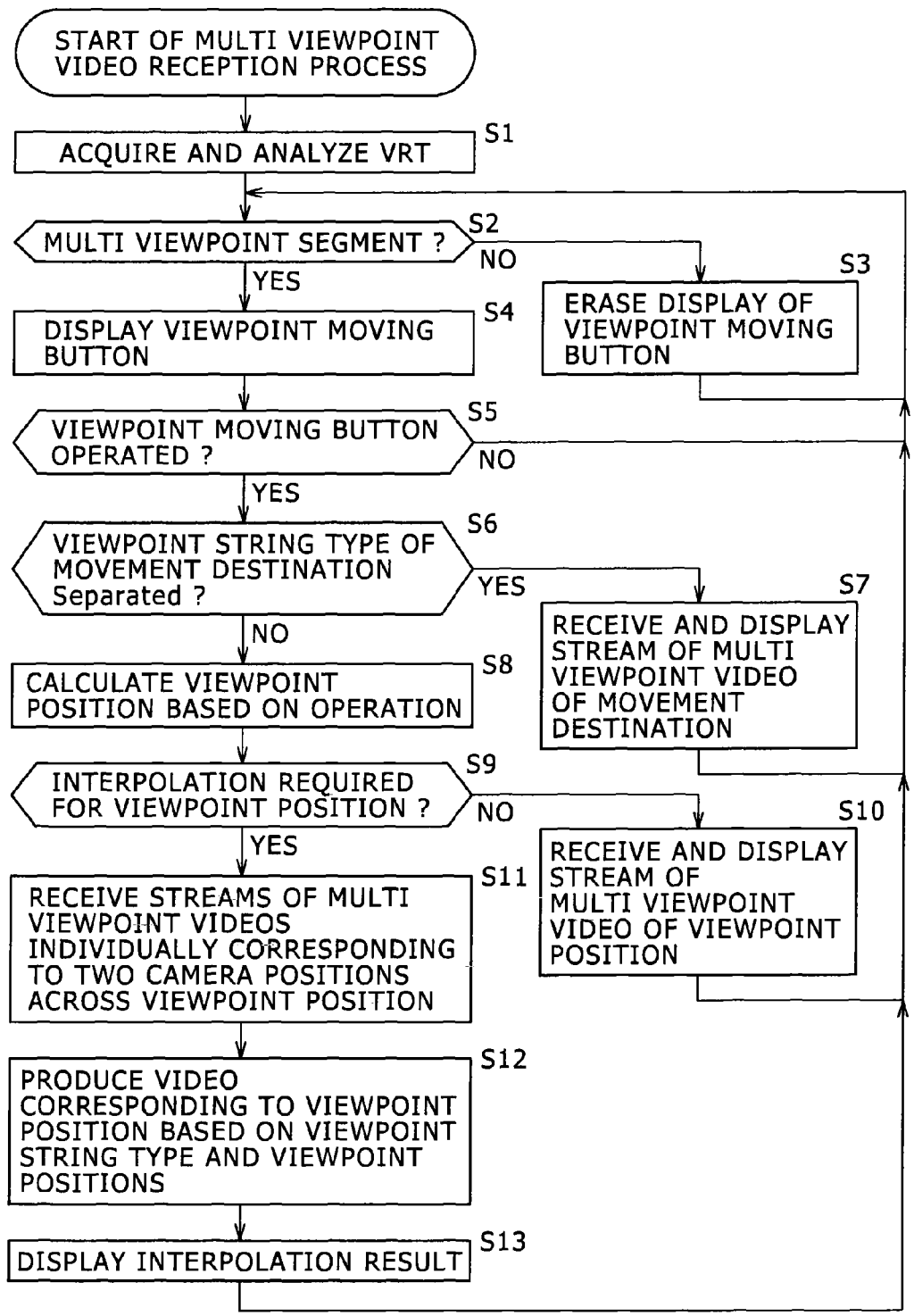
FIG. 14 is a flow chart illustrating a multi viewpoint video reception process.

FIG. 14 is a flow chart illustrating a multi viewpoint video reception process by the reception apparatus 30.

As a prerequisite, it is assumed that the reception apparatus 30 is receiving a default viewpoint video of a video content broadcasted as a television program through the broadcasting network 12.

At step S1, the VRT analysis section 40 acquires and analyzes reference information of a VRT and the VRT supplied thereto from the demultiplexing section 34 or produced by itself and outputs a result of the analysis to the control section 32. At step S2, the control section 32 decides whether or not the progressing position of the video content being received is a multi viewpoint segment.

In the case where it is decided that the progressing position of the video content being received is not a multi viewpoint segment, the processing is advanced to step S3. At step S3, the video processing section 37 erases, if a viewpoint moving button is displayed on a video of the video content being received, the display of the viewpoint moving button under the control of the control section 32. In the case where the viewpoint moving button is not displayed, the video processing section 37 carries out nothing. Thereafter, the processing returns to step S2, and the processes beginning with step S2 are repeated.

In the case where it is decided at step S2 that the progressing position of the video content being reproduced is a multi viewpoint segment, the processing is advanced to step S4. At step S4, the video processing section 37 causes, if a viewpoint moving button is not displayed on the video of the video content being received, the viewpoint moving button to be displayed under the control of the control section 32. In the case where a viewpoint moving button is displayed, the display is maintained.

Figure 15:
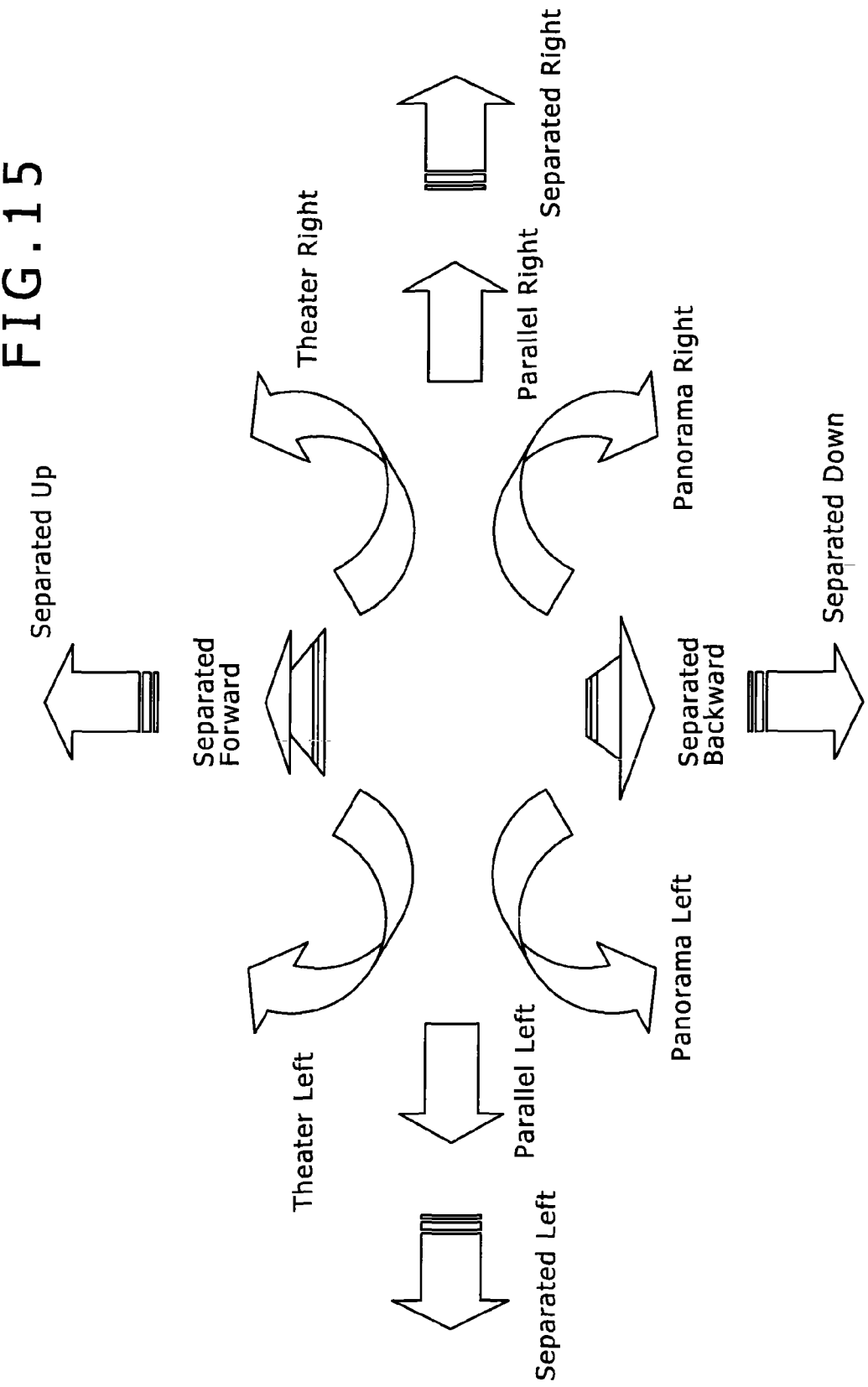
FIG. 15 is a view showing an example of a viewpoint moving button.

Here, the viewpoint moving button displayed on a video of a video content is described. FIG. 15 shows an example of 12 kinds of viewpoint moving buttons. It is to be noted that which one of a plurality of viewpoint moving buttons should be displayed is decided based on the type attribute and the direction attribute of the neighbor_view element included in the View_object element of the viewpoint video being received when the VRT is referred to. In the case where the viewpoint string type is Panorama, Theater or Parallel, the amount of movement of the viewpoint is determined in response to a depression time period or a number of times of depression of the corresponding viewpoint moving button.

Reference is returned to FIG. 14. At step S5, the control section 32 decides based on an input from the operation inputting section 31 whether or not a viewpoint moving button is operated by the user. In the case where a viewpoint moving button is not operated, the processing returns to step S2 and the processes at the steps beginning with step S2 are repeated.

In the case where it is decided at step S5 that a viewpoint moving button is operated, the processing is advanced to step S6. At step S6, the control section 32 decides based on the operated viewpoint moving button whether or not the viewpoint string type to the viewpoint video of the destination of the movement is Separated. In the case where the viewpoint string type is Separated, the processing is advanced to step S7. At step S7, the control section 32 controls the components to receive and decode the viewpoint video of the destination of the movement and output a resulting video signal to the succeeding stage. Thereafter, the processing returns to step S2 and the processes at the steps beginning with step S2 are repeated.

In the case where it is decided at step S6 that the viewpoint string type to the viewpoint video of the destination of the movement is not Separated, the processing is advanced to step S8. At step S8, the control section 32 calculates the amount of the movement of the viewpoint based on the depression time or the number of times of depression of the viewpoint moving button to determine the viewpoint position of the destination of the movement.

At step S9, the control section 32 decides based on the VRT whether or not there exists a viewpoint video actually imaged at the viewpoint position of the destination of the movement to determine whether or not the viewpoint position of the destination of the movement requires interpolation.

In the case where there exists a viewpoint video imaged actually at the viewpoint position of the destination of the movement and the viewpoint position of the destination of the movement does not require interpolation, the processing is advanced to step S10. At step S10, the control section 32 controls the components to receive and decode the viewpoint video corresponding to the viewpoint position of the destination of the movement and output a resulting video signal to the succeeding stage. Thereafter, the processing returns to step S2 and the processes at the steps beginning with step S2 are repeated.

In the case where it is decided at step S9 that there exists no viewpoint video imaged actually at the viewpoint position of the destination of the movement and the viewpoint position of the destination of the movement requires interpolation, the processing advances to step S11. At step S11, the control section 32 controls the components to receive and decode two multi viewpoint videos imaged at actual camera positions across the viewpoint position of the destination of the movement and output resulting two videos to the video processing section 37. At step S12, the video processing section 37 produces, based on the viewpoint string type and the viewpoint positions of the two video signals inputted thereto, a video in a state in which it is imaged at the viewpoint position, and outputs a resulting video signal to the succeeding stage so as to be displayed.

In particular, in the case where, for example, the viewpoint string type of two video signals is Panorama or Parallel, the two video signals are connected to each other in a horizontal direction and a picture frame corresponding to the viewpoint position is cut out. On the other hand, in the case where, for example, the viewpoint string type of the two video signals is Theater, a video corresponding to the viewpoint position is produced by an interpolation process based on the two video signals. It is to be noted that, although an arbitrary technique can be used for the interpolation process, the technique proposed as Japanese Patent Application No. 2010-274808 by the application of the present application may be applied.

Thereafter, the processing returns to step S2 and the processes at the steps beginning with step S2 are repeated. The description of the multi viewpoint video reception process ends therewith.

FIGS. 16A to 16E illustrate an example of a screen transition in response to operations of the viewpoint moving buttons by the user.

Figure 16C:
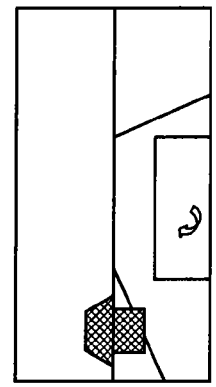
FIGS. 16A to 16E are views illustrating a screen transition in response to an operation of the viewpoint moving button.
Figure 16A:
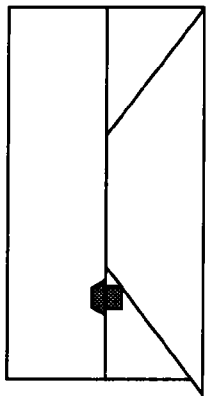
Figure 16B:
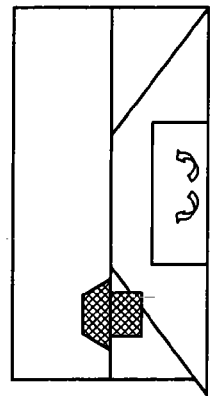

If, for example, when such a default (entry) multi viewpoint video as shown in FIG. 16A is being received, the progressing position of the video content comes to a multi viewpoint segment, then viewpoint moving buttons are displayed on the default (entry) multi viewpoint video as shown in FIG. 16B. In the case of FIG. 16B, viewpoint moving buttons whose viewpoint string type is Theater and which can individually move the viewpoint position toward the left side and the right side are displayed.

If the user operates the viewpoint moving button on the left side on the screen of FIG. 16B, then the video on the screen is changed to a state in which the viewpoint position is moved to the left side on a concentric circle. On the screen after the change, a viewpoint moving button whose viewpoint string type is Theater and which moves the viewpoint position toward the right side, that is, which can restore the state of FIG. 16B, is displayed. On the contrary, if the user operates the viewpoint moving button on the right side on the screen of FIG. 16B, then the video on the screen changes to a state in which the viewpoint position is moved toward the right side on a concentric circle. On the screen after the change, a viewpoint moving button whose viewpoint string type is Theater and which can move the viewpoint position toward the left side, that is, which can restore the state of FIG. 16B, is displayed.

Figure 16E:
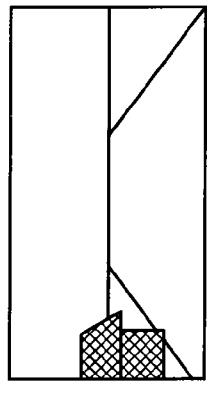
Figure 16D:
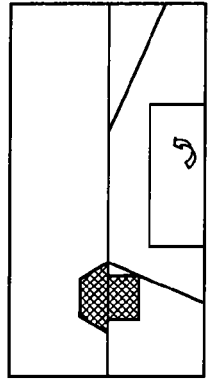

Thereafter, if the progressing position of the video content comes out of the multi viewpoint segment, then the display screen of the viewpoint moving button is erased as shown in FIG. 16E.

With the multi viewpoint video content viewing system described above, for example, the following scenarios can be implemented.

Scenario 1

The full circumference of 360° around a four-wheel drive car, which runs on a savanna in Kenya, is imaged as a multi viewpoint video of the viewpoint string type Panorama from on the four-wheel drive car and is broadcasted. A viewer of this program can change the video to that of an arbitrary direction to discover a wild animal existing therearound.

Scenario 2

A video of a show played in a circular theater in Las Vegas is imaged as a multi viewpoint video, whose viewpoint string type is Theater, by video cameras disposed at fixed intervals along a central passageway provided circularly among seats and is broadcasted. A viewer of this program can view a video in a state in which the stage is seen from an arbitrary position of the central passageway.

Incidentally, while the series of processes described above can be executed by hardware, it may otherwise be executed by software. In the case where the series of processes is executed by software, a program which constructs the software is installed from a program recording medium into a computer incorporated in hardware for exclusive use, a personal computer, for example, for universal use which can execute various functions by installing various programs, and so forth.

Figure 17:
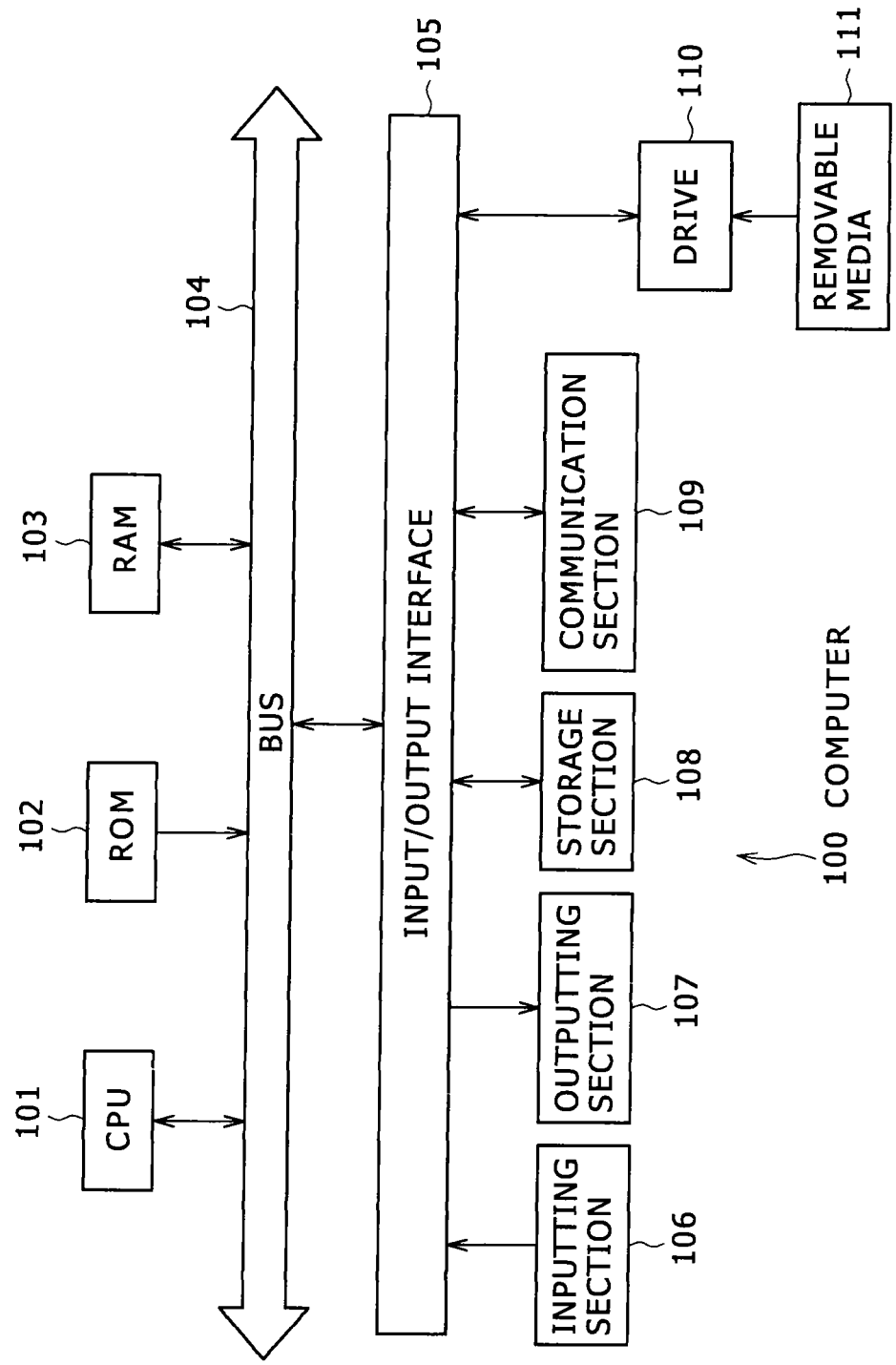
FIG. 17 is a block diagram showing an example of a configuration of a computer.

FIG. 17 is a block diagram showing an example of a hardware configuration of a computer which executes the series of processes described hereinabove in accordance with a program.

In this computer 100, a CPU (Central Processing Unit) 101, a ROM (Read Only Memory) 102 and a RAM (Random Access Memory) 103 are connected to each other by a bus 104.

Further, an input/output interface 105 is connected to the bus 104. An inputting section 106 including a keyboard, a mouse, a microphone and so forth, an outputting section 107 including a display unit, a speaker and so forth, a storage section 108 formed from a hard disk, a nonvolatile memory, or the like, a communication section 109 formed from a network interface or the like, and a drive 110 for driving a removable medium 111 such as a magnetic disk, an optical disk, a magneto-optical disk or a semiconductor memory are connected to the input/output interface 105.

In the computer 100 configured in such a manner as described above, the CPU 101 loads a program stored, for example, in the storage section 108 into the RAM 103 through the input/output interface 105 and the bus 104 and executes the program to carry out the series of processes described above.

It is to be noted that the program to be executed by the computer may be a program of the type by which the processes are carried out in a time series in the order as described in the present specification or a program of the type by which the processes are executed in parallel or executed individually at necessary timings such as when the process is called.

Further, the program may be of the type which is processed by a single computer or may be of the type which is carried out by distributed processing by a plurality of computers. Further, the program may be transferred to and executed by a computer at a remote place.

Further, in the present specification, the term system is used to represent an entire apparatus composed of a plurality of apparatus.

It is to be noted that the embodiment of the present disclosure is not limited to the embodiment described hereinabove but can be altered in various manners without departing from the subject matter of the present disclosure.

What is claimed is:

1. A content transmission apparatus, comprising:
a retaining section implemented by circuitry and adapted to retain a multi viewpoint video content formed from a plurality of viewpoint videos imaged simultaneously by a plurality of different video cameras;
a production section implemented by the circuitry and adapted to produce a VRT including acquisition destination information of the viewpoint videos which configure the multi viewpoint video content, VRT standing for View Relation Table;
a supplying section implemented by the circuitry and adapted to supply the produced VRT to a content reproduction apparatus;
a broadcasting section implemented by the circuitry and adapted to broadcast one or plural ones of the viewpoint videos which configure the retained multi viewpoint video content; and
a delivery section implemented by the circuitry and adapted to deliver one or plural ones of the viewpoint videos which configure the retained multi viewpoint video content through a network.

2. The content transmission apparatus according to claim 1, wherein
said production section produces the VRT which further includes a viewpoint string type representative of a relationship between an adjacent viewpoint video imaged adjacent each of the viewpoint videos which configure the video content and the viewpoint video.

3. The content transmission apparatus according to claim 2, wherein
the viewpoint string type is Panorama, Theater, Parallel or Separated.

4. The content transmission apparatus according to claim 2, wherein
said broadcasting section or said delivery section serves also as said supplying section.

5. A content transmission method for a content transmission apparatus which supplies a multi viewpoint video content formed from a plurality of viewpoint videos imaged simultaneously by a plurality of different video cameras to a content reproduction apparatus, comprising:
producing a VRT including acquisition destination information of the viewpoint videos which configure the multi viewpoint video content, VRT standing for View Relation Table;
supplying the produced VRT to a content reproduction apparatus;
broadcasting one or plural ones of the viewpoint videos which configure the retained multi viewpoint video content; and
delivering one or plural ones of the viewpoint videos which configure the retained video content through a network, carried out by the content transmission apparatus.

6. A non-transitory computer-readable storage medium storing a program for causing a computer to function as:
retain a multi viewpoint video content formed from a plurality of viewpoint videos imaged simultaneously by a plurality of different video cameras;
produce a VRT (View Relation Table) including acquisition destination information of the viewpoint videos which configure the multi viewpoint video content;
supply the produced VRT to a content reproduction apparatus;
broadcast one or plural ones of the viewpoint videos which configure the retained multi viewpoint video content; and
deliver one or plural ones of the viewpoint videos which configure the retained video content through a network.

7. A content reproduction apparatus for reproducing a multi viewpoint video content formed from a plurality of viewpoint videos imaged simultaneously by a plurality of different video cameras, comprising:
an acquisition section implemented by circuitry and adapted to acquire a VRT including acquisition destination information of the viewpoint videos which configure the multi viewpoint video content, VRT standing for View Relation Table;
an inputting section implemented by the circuitry and adapted to input a viewpoint moving operation from a user therethrough;
a reception section implemented by the circuitry and adapted to receive, from among the plural viewpoint videos which configure the multi viewpoint video content, the plurality of viewpoint videos corresponding to the inputted viewpoint moving operation based on the VRT; and
a production section implemented by the circuitry and adapted to produce a video corresponding to the viewpoint moving operation based on the received plural viewpoint videos.

8. The content reproduction apparatus according to claim 7, wherein
the acquired VRT further includes a viewpoint string type representative of a relationship between an adjacent viewpoint video imaged adjacent each of the viewpoint videos which configure the video content and the viewpoint video.

9. The content reproduction apparatus according to claim 8, wherein
the viewpoint string type is Panorama, Theater, Parallel or Separated.

10. The content reproduction apparatus according to claim 9, wherein
said production section connects, in the case where the viewpoint string type of the received plural viewpoint videos is Panorama or Parallel, the received plural viewpoint videos to each other and cuts out a predetermined region to produce a video corresponding to the viewpoint moving operation, but
produces, in the case where the viewpoint string type of the received plural viewpoint videos is Theater, a video corresponding to the viewpoint moving operation by an interpolation process using the received plural viewpoint videos.

11. The content reproduction apparatus according to claim 8, wherein
said reception section receives, from among the plural viewpoint videos which configure the multi viewpoint video content, the plural viewpoint videos corresponding to the inputted viewpoint moving operation from within a broadcasting signal or acquires the plural viewpoint videos corresponding to the inputted viewpoint moving operation from a content transmission apparatus through a communication network.

12. The content reproduction apparatus according to claim 8, wherein
said inputting section is formed from a viewpoint moving button included in the acquired VRT and corresponding to a viewpoint string type of an adjacent viewpoint video imaged adjacent each viewpoint video which configures the multi viewpoint video content.

13. A content reproduction method for a content reproduction apparatus which reproduces a multi viewpoint video content formed from a plurality of viewpoint videos imaged simultaneously by a plurality of different video cameras, comprising:
  acquiring a VRT including acquisition destination information of the viewpoint videos which configure the multi viewpoint video content, VRT standing for View Relation Table;
  inputting a viewpoint moving operation from a user therethrough;
  receiving, from among the plural viewpoint videos which configure the multi viewpoint video content, a plurality of viewpoint videos corresponding to the inputted viewpoint moving operation based on the VRT; and
  producing a video corresponding to the viewpoint moving operation based on the received plural viewpoint videos, carried out by the content reproduction apparatus.

14. A non-transitory computer-readable storage medium storing program for causing a computer, which reproduces a multi viewpoint video content formed from a plurality of viewpoint videos imaged simultaneously by a plurality of different video cameras, to:
  acquire a VRT including acquisition destination information of the viewpoint videos which configure the multi viewpoint video content, VRT standing for View Relation Table;
  input a viewpoint moving operation from a user therethrough;
  receive, from among the plural viewpoint videos which configure the multi viewpoint video content, a plurality of viewpoint videos corresponding to the inputted viewpoint moving operation based on the VRT; and
  produce a video corresponding to the viewpoint moving operation based on the received plural viewpoint videos.

15. A content delivery system which includes:
  a content transmission apparatus; and
  a content reproduction apparatus, wherein
  the content transmission apparatus includes circuitry configured to
    retain a multi viewpoint video content formed from a plurality of viewpoint videos imaged simultaneously by a plurality of different video cameras;
    produce a VRT including acquisition destination information of the viewpoint videos which configure the multi viewpoint video content, VRT standing for View Relation Table;
    supply the produced VRT to the content reproduction apparatus;
    broadcast one or plural ones of the viewpoint videos which configure the retained multi viewpoint video content; and
    deliver one or plural ones of the viewpoint videos which configure the retained multi viewpoint video content through a network; and
  the content reproduction apparatus includes circuitry configured to
    acquire the VRT;
    input a viewpoint moving operation from a user therethrough;
    receive, from among the plural viewpoint videos which configure the multi viewpoint video content, a plurality of the viewpoint videos corresponding to the inputted viewpoint moving operation based on the VRT; and
    produce a video corresponding to the viewpoint moving operation based on the received plural viewpoint videos.

* * * * *